(12) United States Patent
Su et al.

(10) Patent No.: US 9,389,731 B2
(45) Date of Patent: Jul. 12, 2016

(54) OPTICAL TOUCH SYSTEM HAVING AN IMAGE SENSING MODULE FOR GENERATING A TWO-DIMENSIONAL IMAGE AND CONVERTING TO A ONE-DIMENSIONAL FEATURE

(71) Applicant: PixArt Imaging Inc., Hsin-Chu County (TW)

(72) Inventors: Tzung-Min Su, Hsin-Chu County (TW); Chih-Hsin Lin, Hsin-Chu County (TW); Yi-Hsien Ko, Hsin-Chu County (TW); Ming-Tsan Kao, Hsin-Chu County (TW)

(73) Assignee: PIXART IMAGING INC, Hsin-Chu County (TW)

( * ) Notice: Subject to any disclaimer, the term of this patent is extended or adjusted under 35 U.S.C. 154(b) by 120 days.

(21) Appl. No.: 13/657,969

(22) Filed: Oct. 23, 2012

(65) Prior Publication Data

US 2013/0162601 A1 Jun. 27, 2013

(30) Foreign Application Priority Data

Dec. 21, 2011 (TW) .............................. 100147720 A (51) Int. Cl.
*G06F 3/042* (2006.01)
(52) U.S. Cl.
CPC .................................. *G06F 3/0421* (2013.01)

(58) Field of Classification Search
CPC ...................................................... G06F 3/0421
USPC .......................................................... 345/175
See application file for complete search history.

(56) References Cited

U.S. PATENT DOCUMENTS

| | | | |
|---|---|---|---|
| 6,803,906 B1 | 10/2004 | Morrison et al. | |
| 2010/0295810 A1* | 11/2010 | Nagata .................. | G06F 3/0416 345/173 |
| 2011/0050646 A1* | 3/2011 | Teng et al. ..................... | 345/175 |
| 2011/0122097 A1* | 5/2011 | Tsang et al. .................. | 345/175 |
| 2011/0134079 A1* | 6/2011 | Stark .............................. | 345/175 |
| 2011/0241984 A1* | 10/2011 | Morrison et al. ............. | 345/157 |

FOREIGN PATENT DOCUMENTS

| | | |
|---|---|---|
| CN | 101923418 A | 12/2010 |
| TW | 201032105 A1 | 9/2010 |

* cited by examiner

*Primary Examiner* — Long D Pham
(74) *Attorney, Agent, or Firm* — Hauptman Ham, LLP (57) ABSTRACT

There is provided an optical touch system including at least one lighting unit, at least one image sensing module and a processing unit. The image sensing module is configured to capture light of a pointer and the lighting unit to generate a two-dimensional image and to convert entire of the two-dimensional image to a one-dimensional feature. The processing unit positions the pointer according to the one-dimensional feature.

16 Claims, 5 Drawing Sheets

OPTICAL TOUCH SYSTEM HAVING AN IMAGE SENSING MODULE FOR GENERATING A TWO-DIMENSIONAL IMAGE AND CONVERTING TO A ONE-DIMENSIONAL FEATURE

CROSS REFERENCE TO RELATED APPLICATION

This application claims the priority benefit of Taiwan Patent Application Serial No. 100147720, filed on Dec. 21, 2011.

BACKGROUND

1. Field of the Disclosure

This disclosure generally relates to an interactive system and, more particularly, to an optical touch system.

2. Description of the Related Art

An optical touch system may belong to a passive touch system. Different from active touch systems, a pointer configured to control the passive touch system does not consume power such that a user may use any object to be served as the pointer, such as a finger of the user. In this manner, the user does not need to carry an additional pointer with him or her such that the operational convenience is significantly increased. In an optical touch system, how to recognize the two-dimensional position of a contact point is an important topic.

Figure 1:
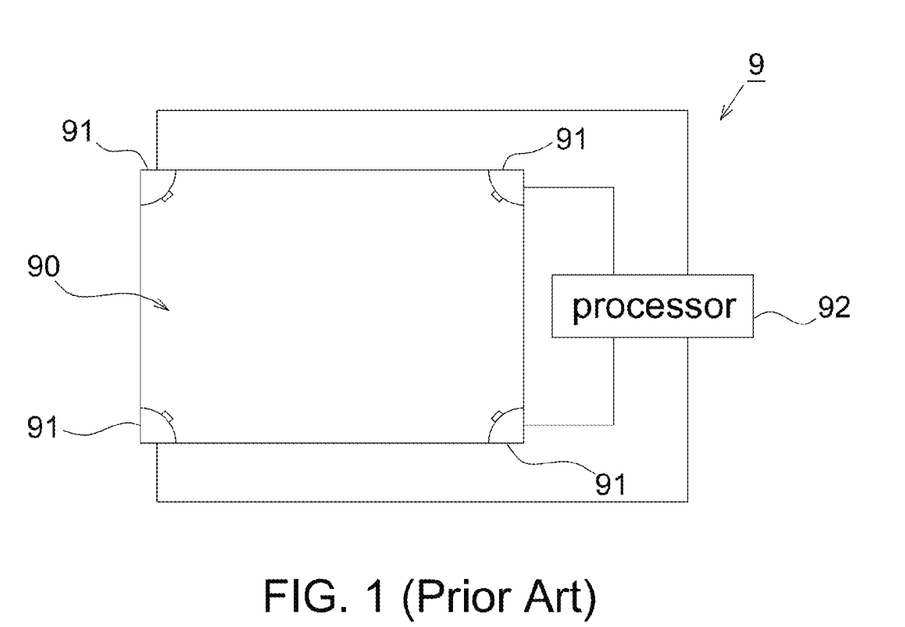
FIG. 1 shows a schematic diagram of a conventional passive touch system.

For example, U.S. Pat. No. 6,803,906, entitled "Passive touch system and method of detecting user input", discloses a passive touch system 9 as shown in FIG. 1. The touch system 9 includes a touch surface 90, four two-dimensional image sensors 91 and a processor 92. The two-dimensional image sensors 91 are configured to acquire two-dimensional images looking across the touch surface 90, and the processor 92 calculates the coordinate of a pointer with respect to the touch surface 90 according to the two-dimensional images.

In the passive touch system 9, the images acquired by the two-dimensional image sensors 91 contain two-dimensional information such that the processor 92 has to process a large amount of data. Therefore, to avoid processing too much useless information by the processor 92, the passive touch system 9 selects a subset of pixels in the two-dimensional images acquired by the two-dimensional image sensors 91 in the alignment routine so as to decrease the amount of data. During normal operation, only the image data of the selected subset of pixels is calculated and other image data without being selected is ignored. However, due to this operation method, said passive touch system 9 has at least the following problems:

(1) An additional step to select a subset of pixels has to be added in the alignment routine; (2) the selected subset of pixels may not be the best image block, e.g. when the touch surface 90 is bent, it may not be able to select a proper subset of pixels such that an error in post-processing may be induced; (3) the selected subset of pixels is a rectangle and a large amount of useless information is still contained therein such that the amount of data transmission and the calculation in post-processing can not be effectively decreased; and (4) the image sensor having a large pixel array has to be employed in order to clearly extract the pointer image such that the image sensors 91 require a larger installation space and are not suitable for electronic products having a small touch surface; and if a smaller pixel array is used, it may not be able to clearly extract the pointer image to degrade the ability of recognizing the touch status.

According, the present disclosure provides an optical touch system that converts the two-dimensional information into the one-dimensional feature at first and then positions the pointer. Even though the image sensor having a small pixel array is employed, the validity of the image data is improved through the dimension conversion such that the amount of data transmission is reduced to be suitable for electronic products having a small size.

SUMMARY

It is an object of the present disclosure to provide an optical touch system capable of reducing the data throughput and increasing applicable range.

It is another object of the present disclosure to provide an optical touch system in which a subset of pixels is not necessary to be selected previously so as to reduce the operational complexity and avoid the calculation error caused by selecting an improper subset of pixels.

To achieve the above objects, the present disclosure provides an optical touch system configured to position a two-dimensional coordinate of a pointer.

An optical touch system of the present disclosure includes a touch surface, at least one lighting unit, at least one image sensing module and a processing unit. The lighting unit is disposed on the touch surface. The at least one image sensing module captures light from the touch surface, the pointer and the lighting unit to generate a two-dimensional image, and converts entire of the two-dimensional image to a one-dimensional feature. The processing unit is configured to position the pointer according to the one-dimensional feature.

An optical touch system of the present disclosure includes a touch surface, a reflecting mirror, at least one light bar, a CMOS image sensor and a processing unit. The reflecting mirror and the at least one light bar are disposed on the touch surface. The CMOS image sensor captures light from the touch surface, the pointer, the reflecting mirror and the light bar to generate a two-dimensional image, and converts entire of the two-dimensional image to a one-dimensional feature. The processing unit is configured to position the pointer according to the one-dimensional feature.

An optical touch system of the present disclosure includes a touch surface, three light bars, two CMOS image sensors and a processing unit. The three light bars are disposed on the touch surface. The two CMOS image sensors respectively capture a two-dimensional image looking across the touch surface and containing the pointer blocking the light bars, and convert entire of the two-dimensional image to a one-dimensional feature. The processing unit is configured to position the pointer according to the one-dimensional feature outputted from the CMOS image sensors. In one embodiment, the three light bars may be combined as a single light bar extending along three edges of the touch surface.

In one aspect, the one-dimensional feature is an intensity array of an intensity sum, an average intensity or a weighted average intensity of every pixel column in the two-dimensional image.

In one aspect, the processing unit defines a ratio or an offset of the intensity array containing no pointer information as a threshold array.

In one aspect, the processing unit compares the intensity array with the threshold array to identify at least one contact point, and positions the pointer according to a spatial relationship between the contact point and the one-dimensional feature.

In the optical touch system of the present disclosure, the image sensing module preferably includes an active image sensor such as a complementary metal-oxide semiconductor (CMOS) image sensor. The optical touch system of the present disclosure does not select a subset of pixels so as to simplify the operation procedure and avoid the error caused by selecting an improper subset.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2A:
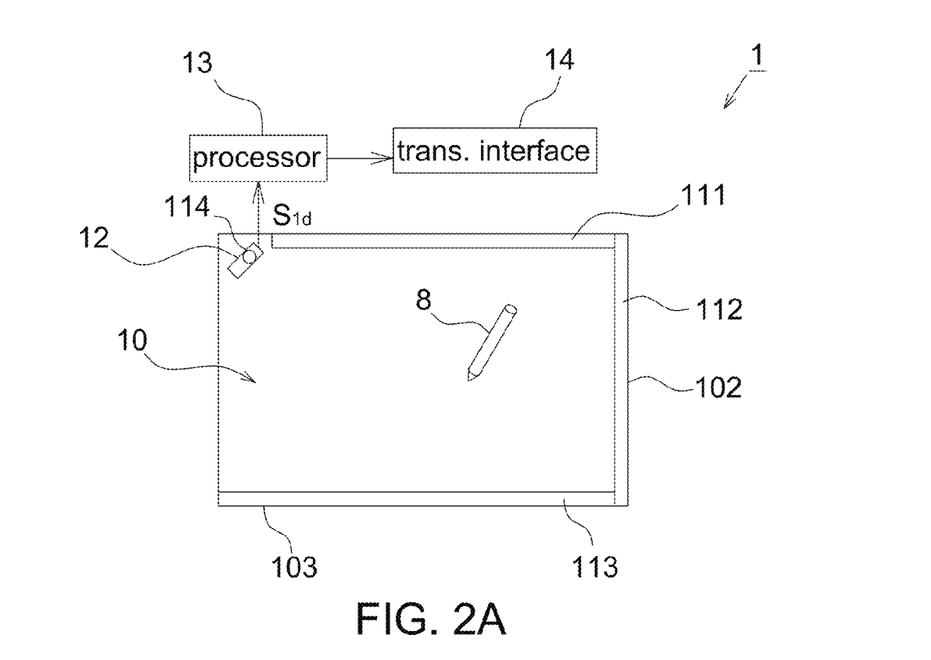
FIGS. 2A-2B show schematic diagrams of the optical touch system according to an embodiment of the present disclosure.
Figure 2B:
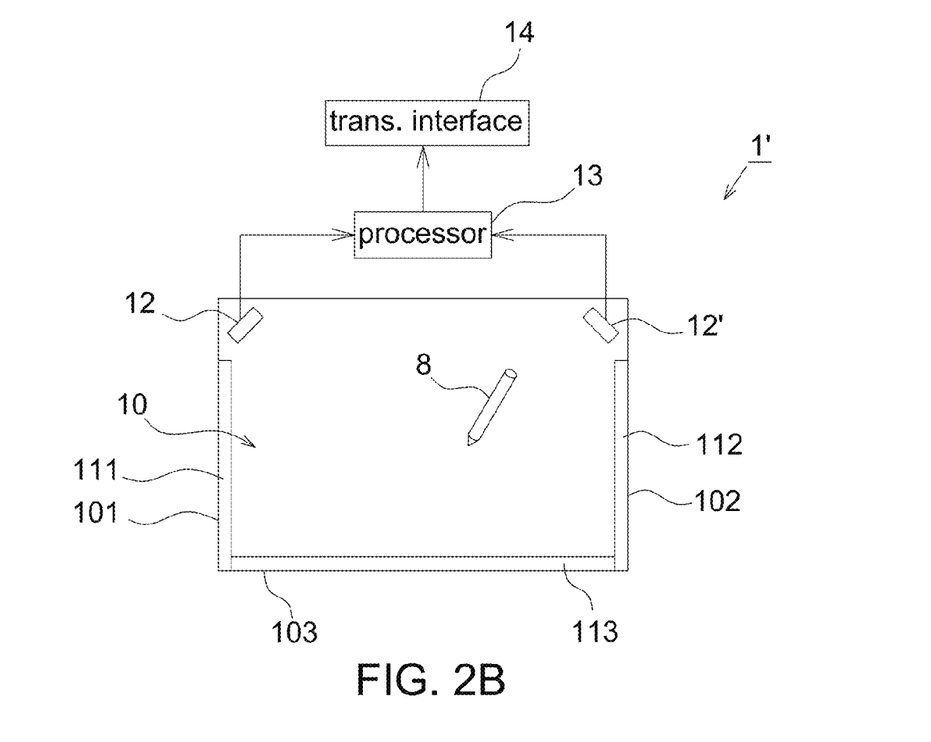

Referring to FIGS. 2A-2B, they show schematic diagrams of the optical touch system according to an embodiment of the present disclosure. The optical touch system 1 and 1' is configured to position a pointer 8 and includes a touch surface 10, at least one lighting unit (e.g. three lighting units 111-113 are shown herein), at least one image sensing module 12 (e.g. one image sensing module is included in FIG. 2A and two image sensing modules are included in FIG. 2B), a processing unit 13 and a transmission interface 14. In some embodiments, three or two of the lighting units 111-113 may be combined as a single lighting unit (described later).

The touch surface 10 may be made of suitable materials and is for the pointer 8 to operate thereon. The pointer 8 may be the finger(s) of a user, a pen or a touch stick, but not limited thereto.

The lighting units 111-113 are disposed on the touch surface 10 and may be properly selected from active light sources or passive light sources, wherein said active light sources may emit light and said passive light sources may reflect light emitted by active light sources or ambient light. In one embodiment, the lighting units 111 and 112 are active light sources (e.g. a light bar) and the lighting unit 113 is a passive light source (e.g. a reflecting mirror) configured to reflect the light emitted by the lighting units 111 and 112. And the optical touch system 1 includes one image sensing module 12 which has a field of view covering at least the lighting units 112 and 113 (FIG. 2A); in another embodiment, the lighting unit 111 may not be implemented and the optical touch system 1 only includes the active light source 112 and the passive light source 113. Accordingly, the pointer 8 may block the lighting unit 112 to form a shadow and form a mirror image in the reflecting mirror (i.e. the lighting unit 113). The processing unit 13 may position a two-dimensional position of the pointer 8 according to the shadow and the mirror image (described later). In another embodiment the lighting unit 111 may not be implemented and the optical touch system 1 only includes one passive light source extending along a second edge 102 and a third edge 103 of the touch surface 10. And the optical touch system may 1 further include a point light source 114 configured to illuminate the passive light source. For example in FIG. 2A the point light source 114 is located nearby the image sensing module 12.

In another embodiment, the lighting units 111-113 are all active light sources and the optical touch system 1 preferably includes two image sensing modules 12 and 12' as shown in FIG. 2B. In this embodiment, a field of view of each of the image sensing modules 12 and 12' preferably covers at least two of the lighting units 111-113. For example, the field of view of the image sensing module 12 preferably covers at least the lighting units 112 and 113; and the field of view of the image sensing module 12' preferably covers at least the lighting units 111 and 113. In other embodiments, the lighting units 111-113 are combined as a single lighting unit extending along a first edge 101, a second edge 102 and a third edge 103 of the touch surface 10, and a field of view of each of the image sensing modules 12 and 12' covers at least a part of the single lighting unit. The image sensing modules 12 and 12' respectively capture the shadow of the pointer 8 blocking the lighting unit (or the lighting units 111-113) to accordingly calculate a two-dimensional position of the pointer 8 by triangulation; or to solve a solution of simultaneous equations of connection lines between positions of the image sensing modules and positions of the shadows in a mapping space (i.e. an intersection of a first connection line between the image sensing module 12 and the shadow and a second connection line between the image sensing module 12' and the shadow) to be served as a coordinate of the pointer 8.

The image sensing modules 12 and 12' preferably include an active image sensor such as a CMOS image sensor. The active image sensor includes a two-dimensional pixel array which preferably has a size smaller than 640×8 for being applied to electronic products having a small touch surface 10. The image sensing modules 12 and 12' are respectively configured to capture a two-dimensional image looking across the touch surface 10 such that the image sensing modules 12 and 12' may capture light from the touch surface 10, the pointer 8 and the lighting unit (or the lighting units 111-113) to generate the two-dimensional image when the pointer 8 approaches (e.g. hovers) or contacts the touch surface 10. After entire of the two-dimensional image is converted into a one-dimensional feature $S_{1d}$ (described later), the one-dimensional feature is outputted to the processing unit 13 for post-processing in order to position the pointer 8. It is appreciated that aforementioned size of the two-dimensional pixel array is only exemplary and not to limit the present disclosure.

It is appreciated that as long as the image sensing modules 12 and 12' are able to capture information of the pointer 8 blocking the lighting units 111-113, the spatial relationship between the image sensing modules 12 and 12' and the lighting units 111-113 is not limited to that shown in FIGS. 2A and 2B.

The processing unit 13 receives the one-dimensional feature from the image sensing modules 12 and 12' and calculates a two-dimensional position of the pointer 8 with respect to the touch surface 10 according to a position of the pointer information (i.e. the contact point) in the one-dimensional feature and positions of the image sensing modules 12 and 12' on the touch surface 10, wherein the method of positioning the pointer 8 according to a one-dimensional relationship of the contact point may be referred to U.S. Pat. No. 7,689,381, entitled "Sensing system", assigned to the same assignee of the present invention.

The transmission interface 14 is configured to wired or wirelessly output the two-dimensional position obtained by the processing unit 13 to an external control unit to correspondingly control an electronic product to execute a predetermined function, wherein said wired and wireless communications are well known techniques and thus details thereof are not described herein.

Methods of converting the two-dimensional image to the one-dimensional feature performed by the image sensing module and identifying at least one contact point performed by the processing unit will be described now, wherein the descriptions are only made by using the image sensing module 12 and the descriptions associated with the image sensing module 12' are similar thereto.

Figure 3A:
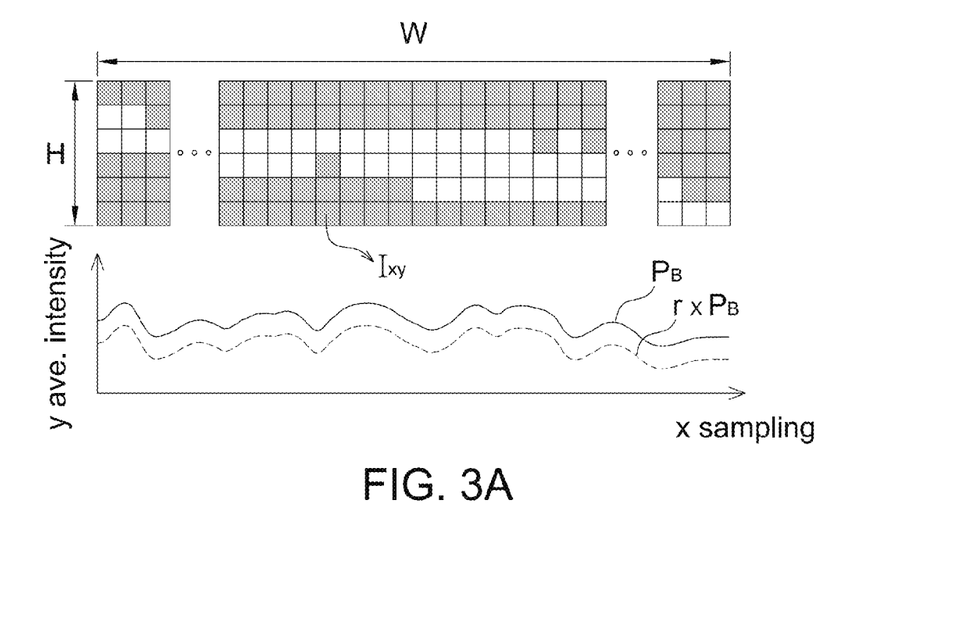
FIG. 3A shows a schematic diagram of a two-dimensional image captured and a one-dimensional feature outputted by the image sensing module of the optical touch system according to the embodiment of the present disclosure, wherein no pointer information is included therein.
Figure 3B:
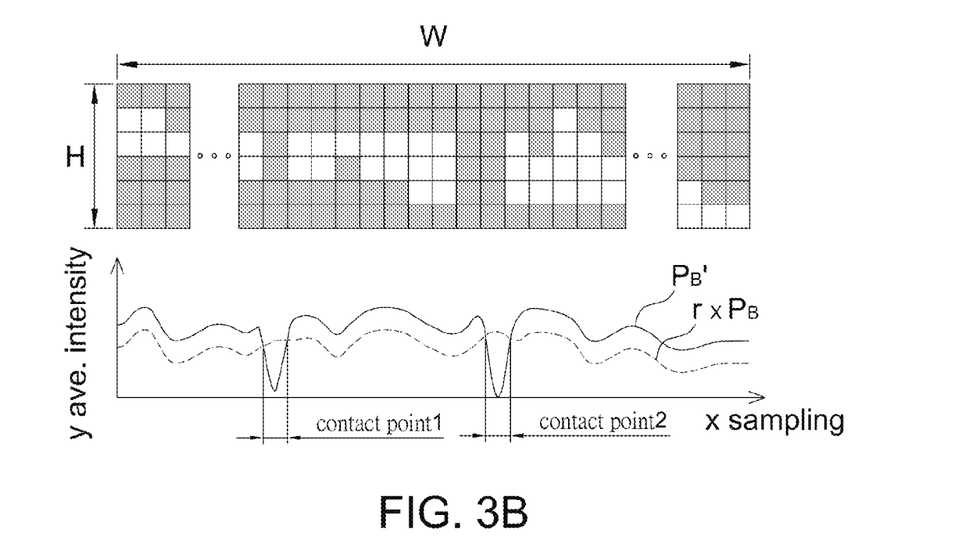
FIG. 3B shows a schematic diagram of a two-dimensional image captured and a one-dimensional feature outputted by the image sensing module of the optical touch system according to the embodiment of the present disclosure, wherein pointer information of two pointers is included therein.

Referring to FIGS. 3A and 3B, FIG. 3A shows a schematic diagram of the two-dimensional image (upper part) captured and the one-dimensional feature (lower part) outputted by the image sensing module 12 of the optical touch system 1, wherein no pointer information is included therein. FIG. 3B shows a schematic diagram of the two-dimensional image captured and the one-dimensional feature outputted by the image sensing module 12 of the optical touch system 1, wherein pointer information of two pointers is included therein.

When the pointer 8 does not approach or contact the touch surface 10 (FIG. 3A), the image sensing module 12 may capture a two-dimensional image having a height of H pixels and a width of W pixels, wherein an intensity of each pixel may be indicated by Ixy in which x denotes a pixel location in a width direction and y denotes a pixel location in a height direction. The image sensing module 12 calculates an intensity sum (equation 1), an average intensity (equation 2) or a weighted average intensity (equation 3) of every pixel column of entire of the H×W two-dimensional image, $$\text{the intensity sum } Ax = \sum_{y=1}^{H} Ixy; \quad \text{(equation 1)}$$

$$\text{the average intensity } Ax = \left(\sum_{y=1}^{H} Ixy\right) / H; \quad \text{(equation 2)}$$

$$\text{the weighted average intensity } Ax = \left(\sum_{y=1}^{H} wIxy\right) / H. \quad \text{(equation 3)}$$

The image sensing module 12 also outputs an intensity array $P_B$=[Ax] of the intensity sum, average intensity or weighted average intensity of every pixel column to be served as the one-dimensional feature $S_{1d}$ which may be sent to the processing unit 13 for post-processing, wherein the weighting w may be determined according to a pixel range desired to be processed in the image.

The processing unit 13 then defines a threshold array configured to identify whether the pointer 8 is in contact with the touch surface 10 or not. In one embodiment, the processing unit 13 multiplies a ratio to the intensity array r×$P_B$ (e.g. r=0.5-0.9, and preferably=0.8) or adds an offset on the intensity array $P_B$ to be served as the threshold array. It is appreciated that the ratio and the offset may be a proper value, e.g. determined according to the sensitivity of the system, but not limited thereto. In addition, based on the intensity distribution of the two-dimensional image, different ratios or offsets may be used on different pixel columns, e.g. the threshold array may be $r_x$×$P_B$, wherein $r_x$ may be changed with x and determined according to the pixel range to be processed without any limitation. The threshold array r×$P_B$ or $r_x$×$P_B$ may be calculated and stored in the processing unit 13 during the turn-on procedure or while receiving an instruction.

When the pointer 8 approaches or contacts the touch surface 10 (FIG. 3B), the image sensing module 12 also captures a two-dimensional image of H×W and outputs an intensity array $P_B$' of an intensity sum, an intensity average or a weighted average intensity of every pixel column to be served a one-dimensional feature $S_{1d}$ which is also sent to the processing unit 13 for post-processing. The processing unit 13 then compares the intensity array $P_B$' with the threshold array r×$P_B$ or $r_x$×$P_B$ so as to identify whether the pointer 8 appears in the one-dimensional feature. For example, when the intensity sum, average intensity or weighted average intensity of any pixel column is smaller than the corresponding threshold value, this pixel column is identified as a contact point, such as a contact point 1 and contact point 2 as shown in FIG. 3B. The processing unit 13 positions the pointer 8 according to a spatial relationship of a position of the contact point and the width W of the two-dimensional image.

In other embodiments, the image sensing module 12 may further include a filter disposed in front of the pixel array thereof such that the pixel array may capture images within a specific region so as to reduce the influence of the pixel signals outside the specific region on the positioning procedure.

Figure 4:
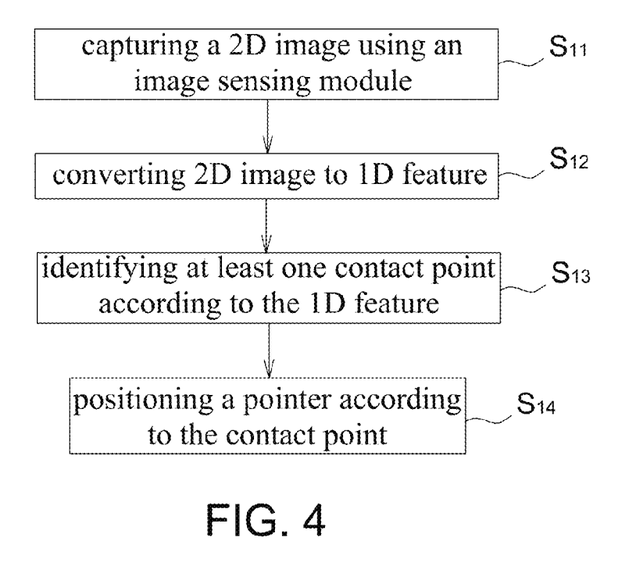
FIG. 4 shows a flow chart of the positioning method of the optical touch system according to an embodiment of the present disclosure.

Referring to FIG. 4, it shows a flow chart of the positioning method of the optical touch system according to an embodiment of the present disclosure which includes the steps of: capturing a two-dimensional image using an image sensing module (Step $S_{11}$); converting the two-dimensional image to a one-dimensional feature (Step $S_{12}$); identifying at least one contact point according to the one-dimensional feature (Step $S_{13}$); and positioning a pointer according to the contact point (Step $S_{14}$).

Referring to FIGS. 2A-5, FIG. 5 shows an optical touch system associated with the positioning method of FIG. 4. In this embodiment, the optical touch system includes a touch surface 10, at least one light bar (e.g. two light bars 111-112 are shown herein), a reflecting mirror 113, an image sensing module 12 and a processing unit 13. The light bars 111-112 and the reflecting mirror 113 are disposed on the touch surface 10. The image sensing module 12 includes a CMOS image sensor configured to capture light of the touch surface 10, pointer 8, reflecting mirror 113 and light bars 111-112 to generate a two-dimensional image and converts entire of the two-dimensional image into a one-dimensional feature. The processing unit 13 positions the pointer 8 according to the one-dimensional feature. As mentioned above, the light bar 111 may not be implemented; or the light bars 111 and 112 may not be implemented and the reflecting mirror 113 extends along two edges of the touch surface 10. And the optical touch system 1 may further include a point light source 114 configured to illuminate the reflecting mirror 113.

Figure 5:
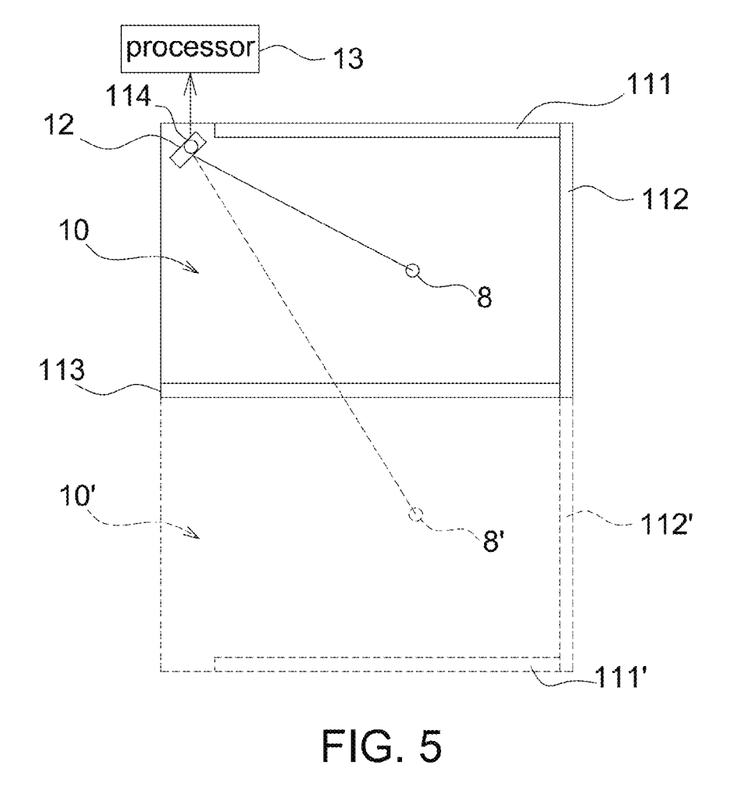
FIG. 5 shows an optical touch system associated with the positioning method of FIG. 4.

Step $S_{11}$: The CMOS image sensor captures a two-dimensional image of H×W as shown in FIGS. 3A and 3B. In this embodiment, as the lighting unit 113 is a reflecting mirror, the touch surface 10, the lighting units 111-112 and the pointer 8 may respectively form a mirror image of touch surface 10', mirror images of lighting units 111'-112' and a mirror image of pointer 8' in the reflecting mirror 113. Therefore, at least one pointer information is included in the two-dimensional image as shown in FIG. 3B.

Step $S_{12}$: The image sensing module 12 calculates an intensity sum, an average intensity or a weighted average intensity of every pixel column according to equations (1) to (3) and then outputs an intensity array $P_B$ of the intensity sum, average intensity or weighted average intensity of every pixel column to be served as the one-dimensional feature.

Step $S_{13}$: The processing unit 13 determines a threshold array $r \times P_B$ or $r_x \times P_B$ according to the intensity array $P_B$ and identifies at least one contact point according to a comparison result of comparing the intensity array $P_B'$ with the threshold array $r \times P_B$ or $r_x \times P_B$, e.g. two contact points are shown in the one-dimensional feature, wherein one contact point is associated with the pointer 8 and the other contact point is associated with the mirror image of pointer 8'.

Step $S_{14}$: The processing unit 13 positions the pointer 8 according to a spatial relationship between the contact point and the width W. As mentioned above, said positioning may use conventional methods and thus details thereof are not described herein.

Figure 6:
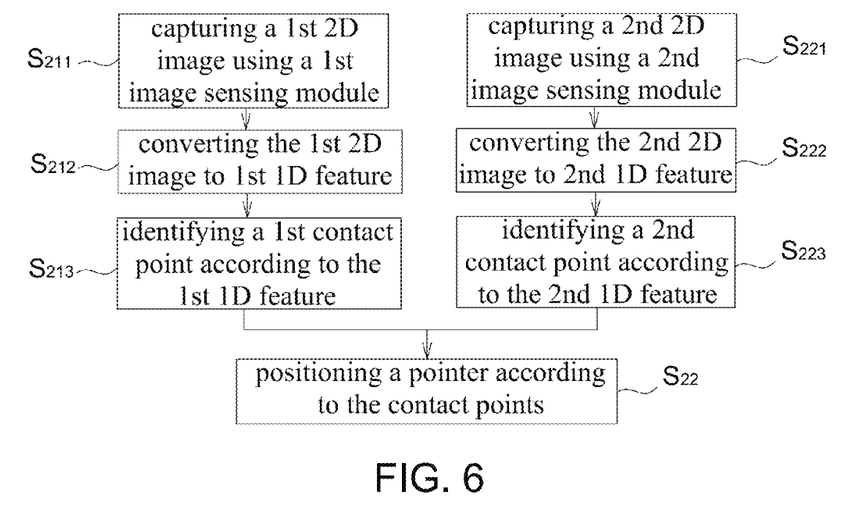
FIG. 6 shows a flow chart of the positioning method of the optical touch system according to another embodiment of the present disclosure.
Figure 7:
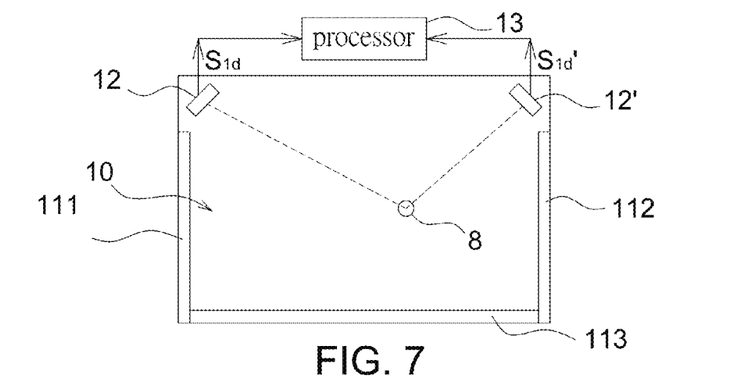
FIG. 7 shows an optical touch system associated with the positioning method of FIG. 6.

Referring to FIG. 6, it shows a flow chart of the positioning method of the optical touch system according to another embodiment of the present disclosure which includes the steps of: capturing a first two-dimensional image using a first image sensing module (Step $S_{211}$); converting the first two-dimensional image to a first one-dimensional feature (Step $S_{212}$); identifying a first contact point according to the first one-dimensional feature (Step $S_{213}$); capturing a second two-dimensional image using a second image sensing module (Step$_{221}$); converting the second two-dimensional image to a second one-dimensional feature (Step $S_{222}$); identifying a second contact point according to the second one-dimensional feature (Step $S_{223}$); and positioning a pointer according to the first contact point and the second contact point (Step $S_{22}$).

Figure 8:
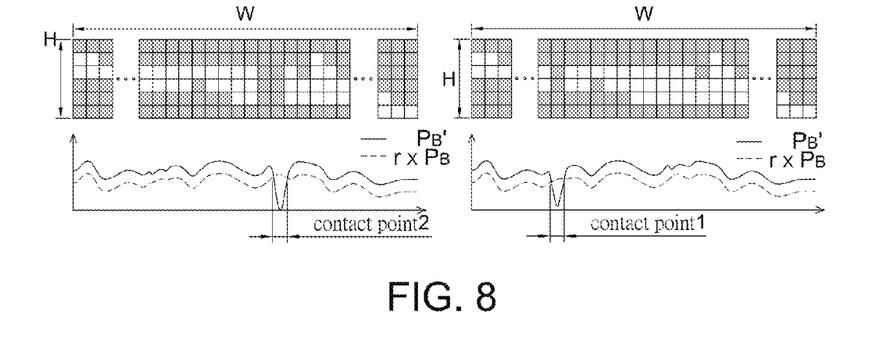
FIG. 8 shows a schematic diagram of two-dimensional images captured and one-dimensional features outputted by the two image sensing modules of the optical touch system according to the embodiment of the present disclosure.

Referring to FIGS. 2B and 6-8, FIG. 7 shows an optical touch system associated with the positioning method of FIG. 6; FIG. 8 shows a schematic diagram of two-dimensional images captured and one-dimensional features outputted by the two image sensing modules of the optical touch system shown in FIG. 7. In this embodiment, the optical touch system includes a touch surface 10, three light bars 111-113, two image sensing modules 12 and 12', and a processing unit 13. The light bars 111-113 are disposed on the touch surface 10. The image sensing modules 12 and 12' include a CMOS image sensor respectively configured to capture a two-dimensional image looking across the touch surface 10 and containing the pointer 8 blocking the light bars 111-113, and to convert entire of the two-dimensional image into a one-dimensional feature. The processing unit 13 positions the pointer 8 according to the one-dimensional features outputted from the CMOS image sensors. As mentioned above, the light bars 111-113 may be combined as a single light bar extending along the three edges of the touch surface 10.

Steps $S_{211}$ and $S_{221}$: The CMOS image sensors respectively capture a two-dimensional image of H×W as shown in FIG. 8.

Steps $S_{212}$ and $S_{222}$: The image sensing modules 12 and 12' respectively calculate an intensity sum, an average intensity or a weighted average intensity of every pixel column according to equations (1) to (3) and then respectively output an intensity array $P_B$ of the intensity sum, average intensity or weighted average intensity to be served as the one-dimensional features $S_{1d}$ and $S_{1d}'$.

Steps $S_{213}$ and $S_{223}$: The processing unit 13 determines a threshold array $r \times P_B$ or $r_x \times P_B$ and identifies at least one contact point according to a comparison result of comparing the intensity array $P_B'$ with the threshold array $r \times P_B$ or $r_x \times P_B$, e.g. each one-dimensional feature showing one contact point (i.e. an intensity dip) herein.

Step $S_{22}$: The processing unit 13 positions the pointer 8 according to a spatial relationship between the contact points and the width W of the two-dimensional images. As mentioned above, said positioning may use conventional methods and thus details thereof are not described herein.

In the present disclosure, as the image sensing modules 12 and 12' have a smaller pixel array, the size thereof can be effectively decreased to be applied to electronic products having a smaller volume. By converting two-dimensional data to one-dimensional data, a position of the contact point can still be identified even the size of the pixel array is decreased. In addition, as the image sensing modules 12 and 12' only output one-dimensional feature to the processing unit 13, the amount of data transmission between the image sensing modules 12, 12' and the processing unit 13 is significantly reduced and the amount of data processed by the processing unit 13 is reduced as well.

As mentioned above, conventional passive touch systems have the problems of large amount of data processing, unsuitable for electronic products having a small volume, complex operation process and difficult to select a proper subset of pixels. Therefore, the present disclosure further provides an optical touch system that can accurately position the pointer even the size of the pixel array is reduced and has the benefits of small amount of data transmission and easy operation. The optical touch system of the present disclosure is suitable for various electronic products.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical touch system, configured to position a pointer, the optical touch system comprising:
   a touch surface;
   at least one lighting unit disposed on the touch surface;
   at least one image sensing module configured to
      capture light of the touch surface, the pointer and the lighting unit to generate a two-dimensional image,
      convert an entirety of the two-dimensional image, which has a plurality of pixel columns each having a plurality of pixels, to a one-dimensional feature by calculating intensities of the pixels of every pixel column to respectively obtain one calculated intensity corresponding to each of the pixel columns, wherein the calculated intensities of the pixel columns form the one-dimensional feature, and
      output the one-dimensional feature formed by the calculated intensities of the pixel columns, without outputting the two-dimensional image to reduce an amount of data transmission; and a processing unit configured to receive the one-dimensional feature and position the pointer according to the one-dimensional feature, wherein the one-dimensional feature is an intensity array of the calculated intensities, and each of the calculated intensities is an intensity sum, an average intensity or a weighted average intensity of the pixels in the corresponding pixel column in the two-dimensional image.

2. The optical touch system as claimed in claim 1, wherein the processing unit is configured to define a ratio or an offset of the intensity array containing no pointer information as a threshold array.

3. The optical touch system as claimed in claim 2, wherein the processing unit is configured to compare the intensity array with the threshold array to identify at least one contact point, and position the pointer according to the contact point.

4. The optical touch system as claimed in claim 1, wherein
the at least one lighting unit comprises (i) one reflecting mirror and at least one light bar, or (ii) one reflecting mirror extending along two edges of the touch surface and one point light source; and
the optical touch system comprises one image sensing module.

5. The optical touch system as claimed in claim 1, wherein
the at least one lighting unit comprises (i) three light bars, or (ii) one reflecting mirror extending along three edges of the touch surface; and
the optical touch system comprises two image sensing modules.

6. The optical touch system as claimed in claim 1, wherein the image sensing module comprises a CMOS image sensor.

7. The optical touch system as claimed in claim 1, wherein each of the calculated intensities in the one-dimensional feature is an intensity sum of the pixels in the corresponding pixel column in the two-dimensional image.

8. The optical touch system as claimed in claim 1, wherein each of the calculated intensities in the one-dimensional feature is an average intensity of the pixels in the corresponding pixel column in the two-dimensional image.

9. The optical touch system as claimed in claim 1, wherein each of the calculated intensities in the one-dimensional feature is a weighted average intensity of the pixels in the corresponding pixel column in the two-dimensional image.

10. An optical touch system, configured to position a pointer, the optical touch system comprising:
a touch surface;
a reflecting mirror disposed on the touch surface;
at least one light bar disposed on the touch surface;
a CMOS image sensor configured to
capture light of the touch surface, the pointer, the reflecting mirror and the light bar to generate a two-dimensional image,
convert an entirety of the two-dimensional image, which has a plurality of pixel columns each having a plurality of pixels, to a one-dimensional feature by calculating intensities of the pixels of every pixel column to respectively obtain one calculated intensity corresponding to each of the pixel columns, wherein the calculated intensities of the pixel columns form the one-dimensional feature, and
output the one-dimensional feature formed by the calculated intensities of the pixel columns, without outputting the two-dimensional image to reduce an amount of data transmission; and
a processing unit configured to receive the one-dimensional feature and position the pointer according to the one-dimensional feature,
wherein the one-dimensional feature is an intensity array of the calculated intensities, and each of the calculated intensities is an intensity sum, an average intensity or a weighted average intensity of the pixels in the corresponding pixel column in the two-dimensional image.

11. The optical touch system as claimed in claim 10, wherein the processing unit is configured to define a ratio or an offset of the intensity array containing no pointer information as a threshold array.

12. The optical touch system as claimed in claim 11, wherein the processing unit is configured to compare the intensity array with the threshold array to identify at least one contact point, and position the pointer according to the contact point.

13. An optical touch system, configured to position a pointer, the optical touch system comprising:
a touch surface;
three light bars disposed on the touch surface;
two CMOS image sensors respectively configured to
capture a two-dimensional image looking across the touch surface and containing the pointer blocking the light bars,
convert an entirety of the two-dimensional image, which has a plurality of pixel columns each having a plurality of pixels, to a one-dimensional feature by calculating intensities of the pixels of every pixel column to respectively obtain one calculated intensity corresponding to each of the pixel columns, wherein the calculated intensities of the pixel columns form the one-dimensional feature, and
output the one-dimensional feature formed by the calculated intensities of the pixel columns, without outputting the two-dimensional image to reduce an amount of data transmission; and
a processing unit configured to position the pointer according to the one-dimensional feature received from the CMOS image sensors,
wherein the one-dimensional feature is an intensity array of the calculated intensities, and each of the calculated intensities is an intensity sum, an average intensity or a weighted average intensity of the pixels in the corresponding pixel column in the two-dimensional image.

14. The optical touch system as claimed in claim 13, wherein the processing unit is configured to define a ratio or an offset of the intensity array containing no pointer information as a threshold array.

15. The optical touch system as claimed in claim 14, wherein the processing unit is configured to compare the intensity array with the threshold array to identify at least one contact point, and position the pointer according to the contact point.

16. The optical touch system as claimed in claim 13, wherein the three light bars are combined as a single light bar extending along three edges of the touch surface.

* * * * *